(12) United States Patent
Waldron (10) Patent No.: US 10,495,857 B2
(45) Date of Patent: Dec. 3, 2019

(54) LARGE FIELD-OF-VIEW IMAGING SYSTEMS

(71) Applicant: Goodrich Corporation, Charlotte, NC (US)

(72) Inventor: Erik L. Waldron, Concord, MA (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 15/861,531

(22) Filed: Jan. 3, 2018

(65) Prior Publication Data

US 2019/0204568 A1 Jul. 4, 2019

(51) Int. Cl.
| | |
|---|---|
| *H04N 5/225* | (2006.01) |
| *G02B 13/06* | (2006.01) |
| *H04N 5/232* | (2006.01) |
| *G02B 26/08* | (2006.01) |
| *G02B 5/00* | (2006.01) |
| *H04N 3/09* | (2006.01) |
| *G02B 27/10* | (2006.01) |

(52) U.S. Cl.
CPC ............. *G02B 13/06* (2013.01); *G02B 5/001* (2013.01); *G02B 26/0833* (2013.01); *H04N 3/09* (2013.01); *H04N 5/2259* (2013.01); *H04N 5/23238* (2013.01); *G02B 27/1066* (2013.01)

(58) Field of Classification Search
CPC .................................................... G02B 13/06
See application file for complete search history.

(56) References Cited

U.S. PATENT DOCUMENTS

| | | | |
|---|---|---|---|
| 6,495,827 B2 | 12/2002 | Metcalf et al. | |
| 9,325,947 B2 | 4/2016 | Bridge et al. | |
| 9,329,365 B2 | 5/2016 | Mrozek et al. | |
| 9,395,617 B2* | 7/2016 | McCain | G02B 13/06 |
| 9,544,488 B2 | 1/2017 | Dawson et al. | |
| 2011/0211106 A1* | 9/2011 | Marks | G02B 13/06 |
| | | | 348/340 |
| 2014/0139623 A1 | 5/2014 | McCain et al. | |
| 2015/0207990 A1 | 7/2015 | Ford et al. | |
| 2017/0176730 A1 | 6/2017 | Ford et al. | |

FOREIGN PATENT DOCUMENTS

WO 2005043227 A2 12/2005

OTHER PUBLICATIONS

Partial European Search Report dated May 22, 2019 issued during the prosecution of European Patent Application No. EP 19150030.5 (14 pages).

* cited by examiner

*Primary Examiner* — Gary C Vieaux
(74) *Attorney, Agent, or Firm* — Locke Lord LLP; Daniel J. Fiorello; Joshua L. Jones (57) ABSTRACT

A large field-of-view (FOV) imaging apparatus includes a monocentric lens, and a plurality of imaging modules comprising digital mirror device(s) (DMD) arranged to form or arranged in proximity to a spherical focal surface in optical communication with the monocentric lens such that the monocentric lens directs light rays that enter the monocentric lens at a surface of the monocentric lens towards the spherical focal surface and into the imaging modules as a function of incident angle of each light ray relative to a reference plane.

19 Claims, 10 Drawing Sheets

LARGE FIELD-OF-VIEW IMAGING SYSTEMS

BACKGROUND

1. Field

The present disclosure relates to imaging systems, more specifically to large field-of-view (FOV) imaging systems.

2. Description of Related Art

A long-standing challenge in imaging is to cover a very large field-of-view (FOV) at video rates and at high resolution. This typically requires many lenses, many focal plane arrays, large rapidly moving parts, and a large amount of bandwidth. Because of these demands the resulting systems tend to be very large, expensive, and have difficulty dealing with data bandwidth and frame rates near video speed. This problem is even more acute in the infrared spectrum due to the cost of detectors and lenses. Panoramic imaging is even more challenging.

Such conventional methods and systems have generally been considered satisfactory for their intended purpose. However, there is still a need in the art for improved large field-of-view imaging systems. The present disclosure provides a solution for this need.

SUMMARY

A large field-of-view (FOV) imaging apparatus includes a monocentric lens, and a plurality of imaging modules comprising digital mirror device(s) (DMD) arranged to form or arranged in proximity to a spherical focal surface in optical communication with the monocentric lens such that the monocentric lens directs light rays that enter the monocentric lens at a surface of the monocentric lens towards the spherical focal surface and into the DMDs as a function of incident angle of each light ray relative to a reference plane. The apparatus can include a conical mirror disposed in optical communication with the surface of the monocentric lens and configured to reflect light rays at a predetermined range of angles to provide a predetermined FOV.

The predetermined FOV can be approximately 45 degrees (e.g., 50 degrees), or any other suitable FOV. The predetermined field of view can be from approximately −25 degrees from the reference plane to approximately 25 degrees from the reference plane. The reference plane can be orthogonal to a central axis of the monocentric lens (e.g., a horizontal plane), for example. The apparatus can include a clear aperture disposed in the monocentric lens. In certain embodiments, the clear aperture can be sized to have an f number of no less than approximately 1.0, e.g., approximately 2.0, approximately 1.5 to approximately 1.0. The f number=focal length/clear aperture diameter.

The clear aperture can be disposed in the center of the monocentric lens. The clear aperture can be configured to allow light ray angles of less than approximately 70 degrees from the monocentric lens' optical axis, or any other suitable angle.

Each of the DMDs can include a DMD array comprising a plurality of micro-mirrors in optical communication with a focal plane array (FPA). An amount of FPA pixels can be less than or equal to an amount of the DMD micro-mirrors and/or the FPAs can be compressively sampled according to a compressed-sensing algorithm. Each DMD array can be in optical communication with a single photosensitive device or pixel (e.g., a single FPA pixel), for example.

The apparatus can include a compressed sensing module configured to control a state of the micro-mirrors between an on-state and an off-state, and to select a simultaneous and/or time-sequenced activation pattern of micro-mirrors between the on-state and off-state. The module can be configured to allow for reconstructing an image based on the activation pattern of the micro-mirrors.

In certain embodiments, the compressed sensing module can be configured to activate each micro-mirror individually in a time sequenced activation pattern for maximum resolution. The compressed sensing module can be configured to activate a plurality of micro-mirrors simultaneously for less than maximum resolution.

The compressed sensing module can be configured to activate time-sequenced varying pluralities of micro-mirrors to obtain at least one activation of all micro-mirrors. In certain embodiments, the time sequenced varied pluralities can include a single actuation of each micro-mirror.

The compressed sensing module can be configured to modify the activation pattern of one or more of the DMD arrays to enhance resolution of a portion of the FOV, for example. In certain embodiments, the apparatus can include a tracking module configured to track an object and to cause enhanced resolution for areas of the image associated with the object. In certain embodiments, the apparatus does not include any macro-moving parts.

In accordance with at least one aspect of this disclosure, a method can include controlling a plurality of micro-mirrors of a digital micro-mirror device (DMD) in time sequence to create a pixelated image based on a location of one or more of the micro-mirrors and a light signal received at a light sensor as a function of time. The method can include controlling a simultaneous and/or sequential activation pattern of the plurality of the micro-mirrors to control a resolution of the pixelated image.

In accordance with at least one aspect of this disclosure, an imaging apparatus, comprising, a plurality of imaging modules each having at least one digital mirror device (DMD); and at least one optical element defining an axis (e.g., a horizontal axis), the at least one optical element being in optical communication with the plurality of imaging modules such that the plurality of imaging modules can simultaneously capture images that collectively are representative of a field of view a full 360 degrees about the axis and surrounding the imaging apparatus. The apparatus can include a compressed sensing module in operable communication with the at least one DMD configured to alter resolution of images captured by one or more of the plurality of imaging modules. In certain embodiments, none of the at least one optical element moves relative to the plurality of imaging modules while images are being captured.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
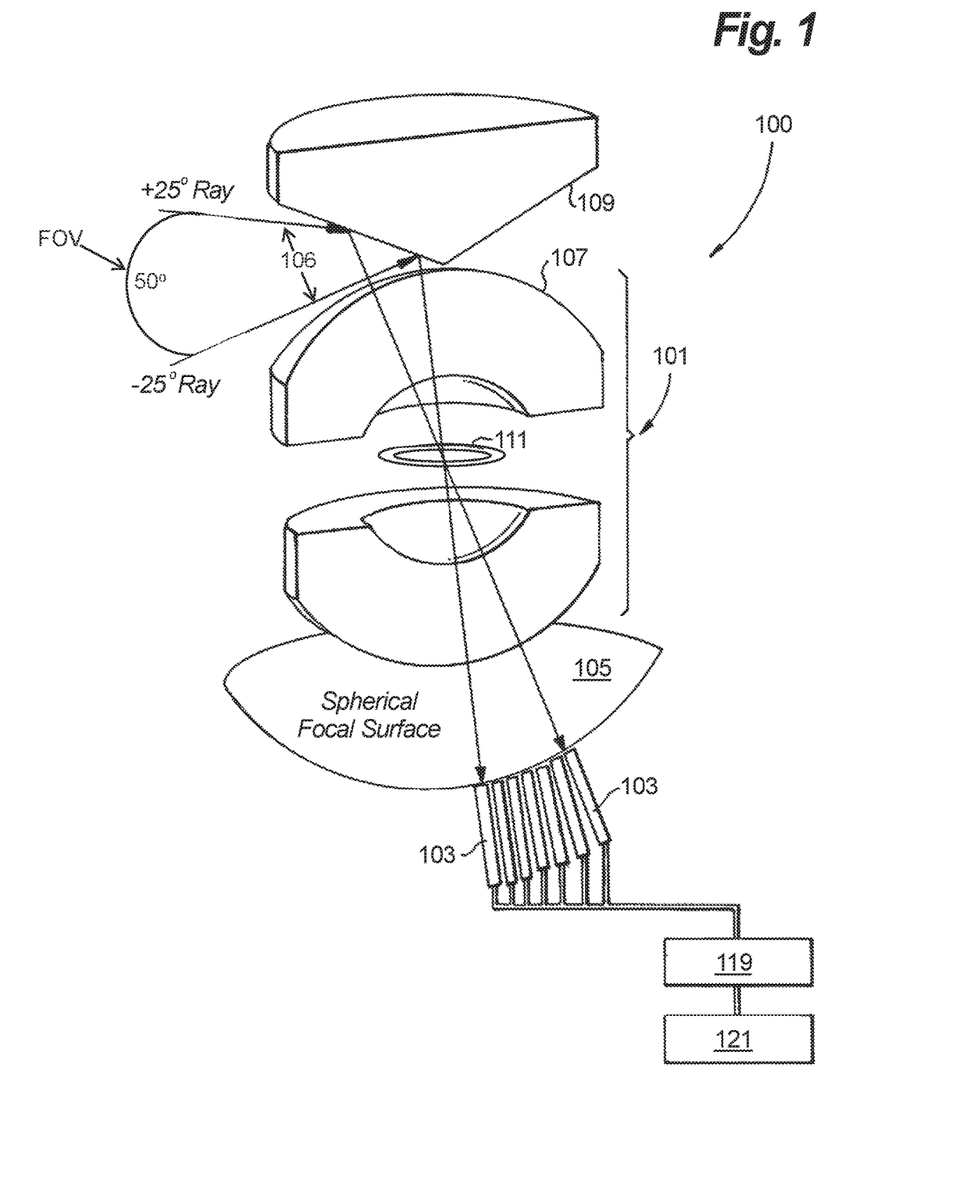
FIG. 1 is a schematic view of an embodiment of an apparatus in accordance with this disclosure, wherein the monocentric lens is shown missing an internal component to show the clear aperture.

Reference will now be made to the drawings wherein like reference numerals identify similar structural features or aspects of the subject disclosure. For purposes of explanation and illustration, and not limitation, an illustrative view of an embodiment of an apparatus in accordance with the disclosure is shown in FIG. 1 and is designated generally by reference character 100. Other embodiments and/or aspects of this disclosure are shown in FIGS. 2-9. Embodiments described herein can be used to acquire and compress the amount of data required in large field of view systems, and/or for any other suitable imaging use.

Figure 2:
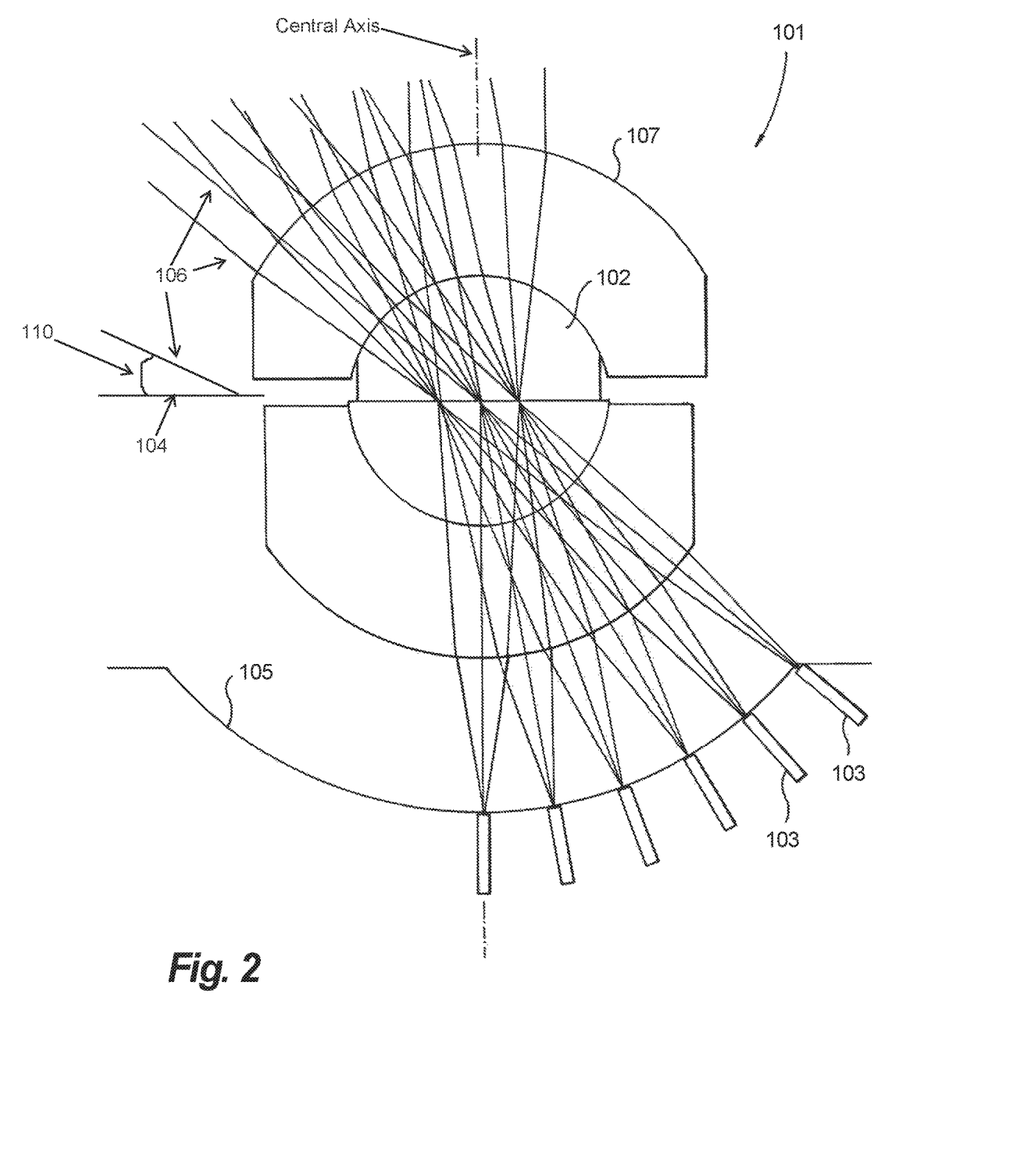
FIG. 2 is cross-sectional diagram showing the monocentric lens having the internal component and showing the monocentric lens directing all light of the same incident angle to a point on the focal surface.

Referring to FIGS. 1 and 2, a large field-of-view (FOV) imaging apparatus 100 includes a monocentric lens 101 (internal components 102 shown in FIG. 2). The monocentric lens 101 can include any suitable shape and/or size and/or components to achieve a desired optical result and/or as appreciated by those having ordinary skill in the art. The apparatus 100 includes an imaging module comprising a plurality of digital mirror device (DMD) 103 (only a partial amount shown in FIG. 1) arranged to form or arranged in proximity to a spherical focal surface 105 in optical communication with the monocentric lens 101 such that the monocentric lens 101 directs light rays 106 that enter the monocentric lens 101 at a surface 107 of the monocentric lens 101 towards the spherical focal surface 105 and into the DMDs 103 as a function of incident angle 110 relative to a reference plane 104 of the.

In certain embodiments, the spherical focal surface 105 is a surface defined by a particular arrangement of the DMDs 103. However, it is contemplated that the DMD modules may be offset somewhat from the monocentric lens' spherical focal surface 105 as appreciated by those having ordinary skill in the art in view of this disclosure. In certain embodiments, the apparatus 100 can include a conical mirror 109 disposed in optical communication with the surface 107 of the monocentric lens 101 and configured to reflect light rays at a predetermined range of angles to provide a predetermined FOV. In certain embodiments, the predetermined FOV can be approximately 50 degrees, or any other suitable FOV. For example, for certain applications, as shown in FIGS. 1 and 4, the predetermined field of view can be from approximately −25 degrees from horizontal to approximately 25 degrees from horizontal.

As appreciated by those having ordinary skill in the art, the term "horizontal" is not necessarily relative to earth/gravity or a fixed orientation of the system relative to a fixed structure. The reference plane 104 can be local reference plane and can be defined as, e.g., 90 degrees from the peak of the monocentric lens, or orthogonal to a central axis of the monocentric lens, or any other suitable definition. Moreover, it is contemplated that any other suitable frame of reference can be used to describe the incident angle of light rays, fixed or local.

Figure 4:
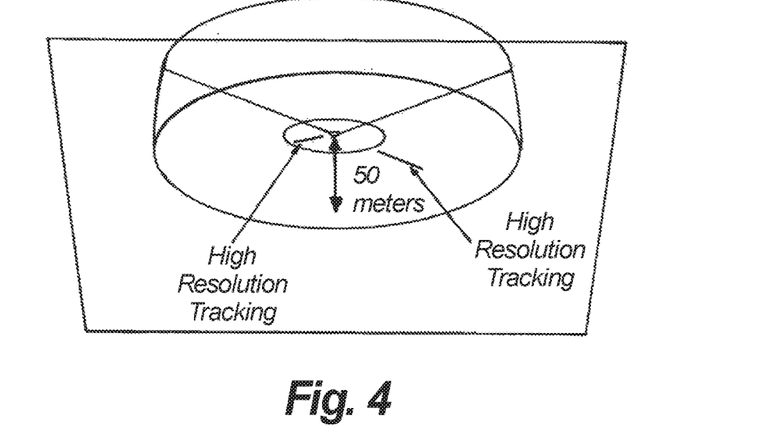
FIG. 4 is a schematic diagram of a field of view for certain embodiments in accordance with this disclosure.

The embodiment as shown in FIG. 4 is placed 50 meters above a surface (e.g., on a ship, above the water surface) and shows a somewhat toroidal, annular-shaped field of view. Embodiments may also be placed in a fixed position with respect to a frame of reference or attached to, or articulated from, a vehicle, for example. Without the conical mirror 109, the FOV would have a different shape (e.g., a cone facing the direction of the surface 107). Also, the position relative to the surface 107 and/or angle of the conical mirror 109 can be modified to achieve any and all desired multitude of field of views. In certain embodiments, instead of a conical mirror one may use an azimuthally symmetric mirror to increase signal coming from a particular collection of elevation angles, and may correct for the resulting field distortion using correction lenses in addition to the monocentric lens.

Referring again to FIG. 1, the apparatus 100 can include a clear aperture 111 disposed in the monocentric lens 101. As shown, the clear aperture 111 can be disposed in the center of the monocentric lens 101. The clear aperture 111 can be configured to allow light rays to pass with angles of less than approximately 70 degrees, or any other suitable angles. The clear aperture 111 can be sized to have an f number of no less than approximately 1.5 to approximately 1.0 (e.g., approximately 2.0), or any other suitable size. The f number=focal length/clear aperture diameter. The clear aperture 111 can include any other suitable size to allow imaging using the monocentric lens 101.

Figure 3:
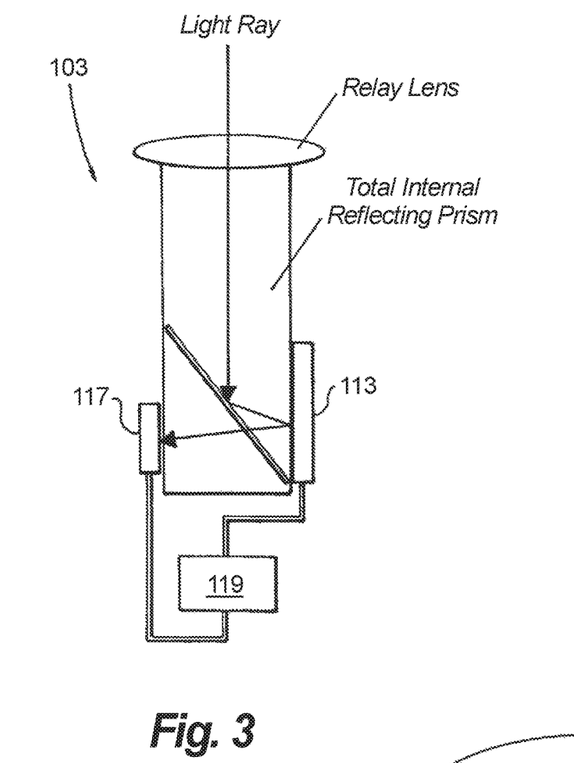
FIG. 3 is a schematic diagram of an embodiment of a digital micro-mirror device (DMD) imaging module in accordance with this disclosure.
Figure 5:
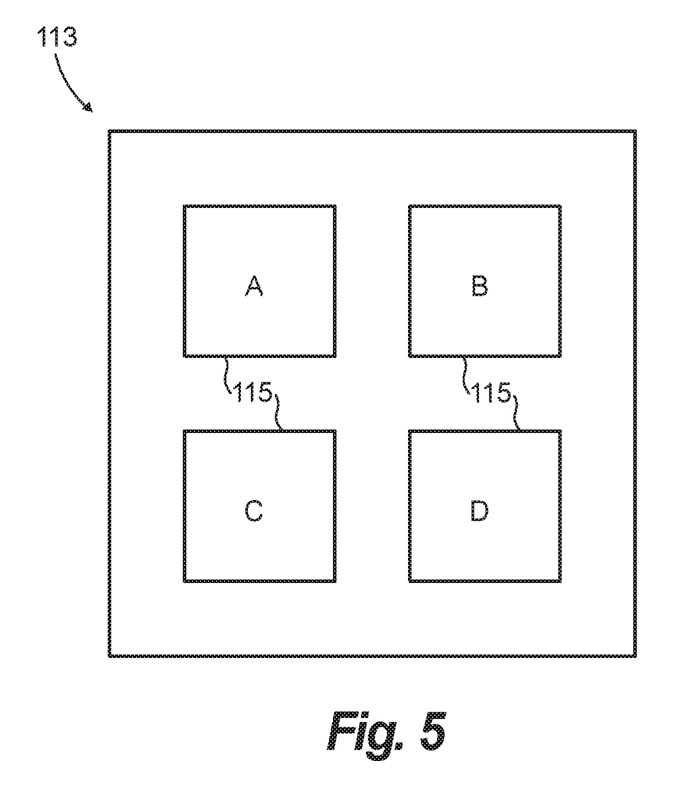
FIGS. 5-9 show an example embodiment of a DMD and a various embodiments of controlling micro-mirrors of the DMD to produce an image.
Figure 11:
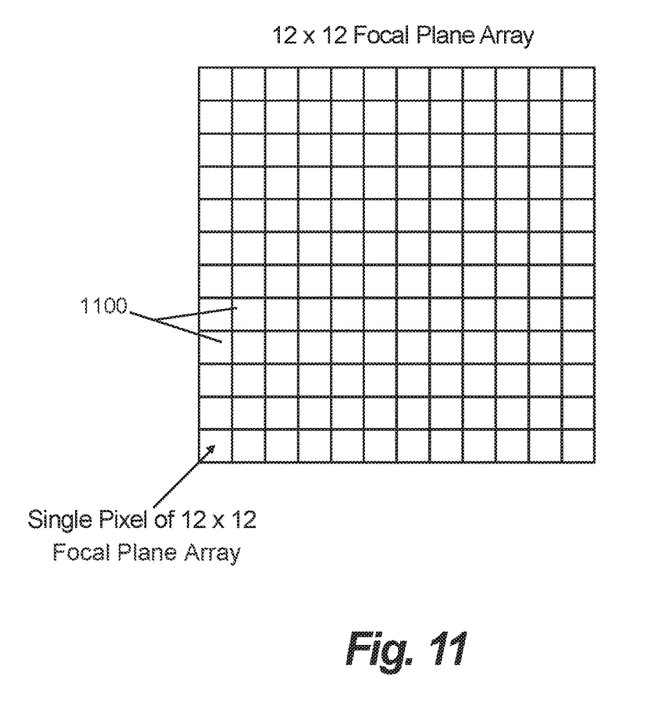
FIG. 11 is a schematic view of an embodiment of a focal plane array shown having 12×12 pixels.

Referring to FIGS. 3 and 5, each of the DMDs 103 can include a DMD array 113 comprising a plurality of micro-mirrors 115 (e.g., as shown in FIGS. 5-9) in optical communication with a focal plane array (FPA) 117. Referring additionally to FIG. 11, an example FPA is shown. An amount of FPA pixels 1100 can be less than an amount of the DMD micro-mirrors 115, which can reduce the required amount of FPA pixels, and thus cost, complexity, and data rates for the apparatus 100. Each DMD array can be in optical communication with a single photosensitive device or pixel (e.g., a single FPA pixel), for example. As shown, in FIG. 3, a light ray from the monocentric lens 101 can enter into a relay lens which can transfer and reduce the intermediate image onto the FPA 117 via a total internal reflecting prism and the DMD 113. Any other suitable configuration for the DMDs 103 is contemplated herein.

Figure 6:
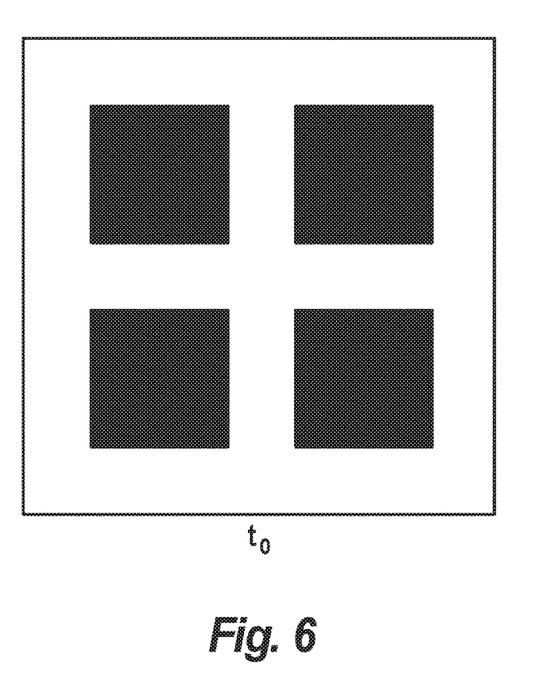
Figure 7:
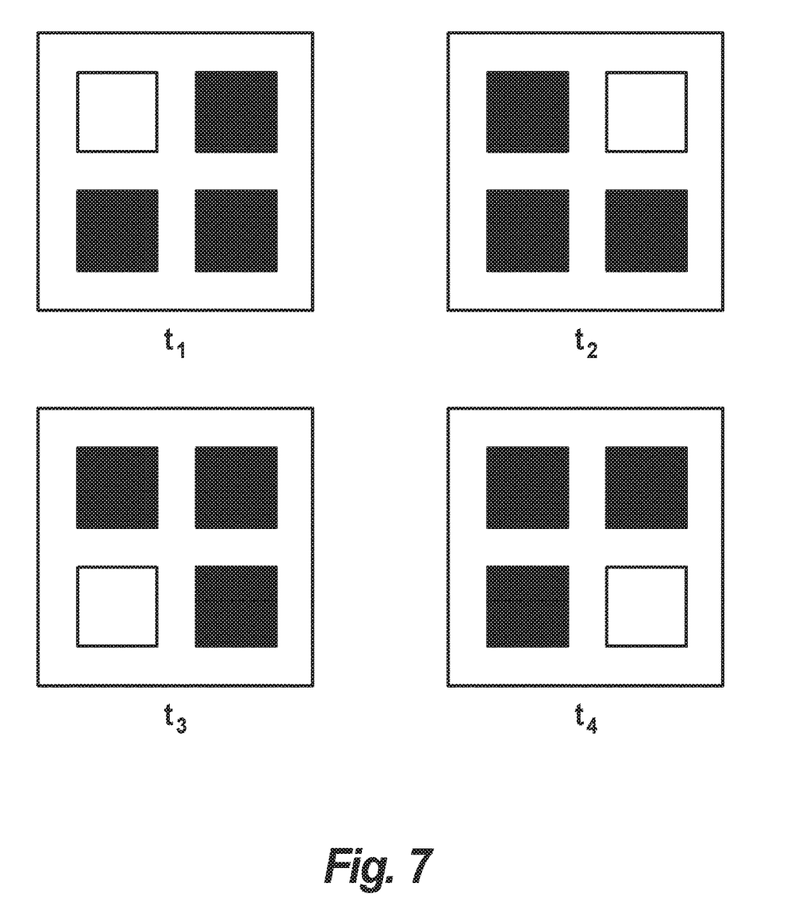
Figure 8:
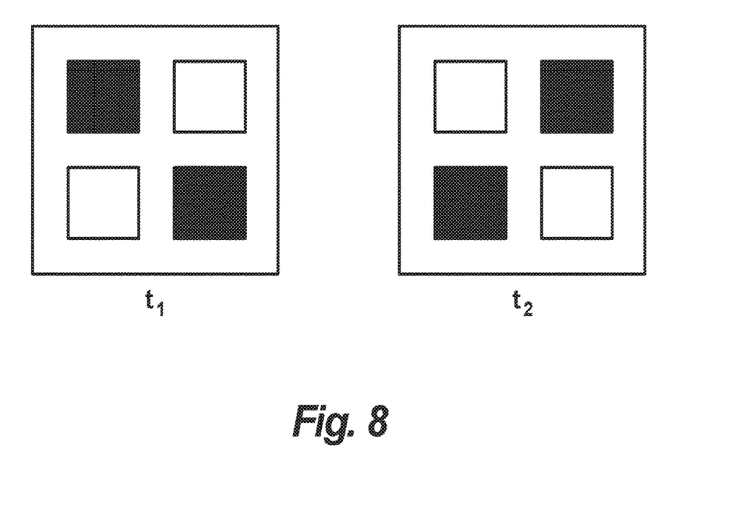
Figure 9:
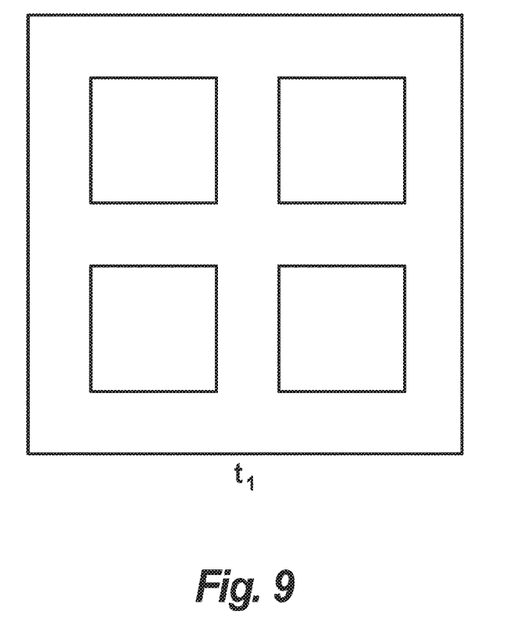

The apparatus can include a compressed sensing module 119 operatively connected to the DMD 113 and the FPA 117 and configured to control a state of the micro-mirrors 115 between an on-state (e.g., as shown in FIGS. 7-9) and an off-state (e.g., as shown in FIG. 6). The compressed sensing module 119 can be configured to select a simultaneous and/or time-sequenced activation pattern of micro-mirrors 115 between the on-state and off-state. The compressed sensing module 119 can be configured to allow for reconstruction of an image based on the activation pattern of the micro-mirrors 115. Reconstruction of images can be done by the compressed sensing module 119 (which can include a plurality of modules itself), and/or any other suitable external component(s) (e.g., a reconstruction module in communication with the compressed sensing module).

Referring additionally to FIGS. 6 and 7, in certain embodiments, the compressed sensing module can be configured to activate each micro-mirror 115 individually in a time sequenced activation pattern for maximum resolution. For example, as shown in FIG. 6, at $t_0$, each micro-mirror 115 can be in an off-state. The module 119 can then sequentially activate each micro-mirror 115 (e.g., labeled as A, B, C, and D) from $t_1$ to $t_n$ (e.g., where n=4 in the shown cases). The FPA 117 reads each response at $t_1$ through $t_n$, and then a data point for each micro-mirror 115 will have been created. Each response can be assembled together to create an n-pixel image of maximum resolution. Any sequential pattern is contemplated herein and activation of each micro-mirror 115 may even be randomized. Also, not all of the micro-mirrors 115 have to be activated in a sequential pattern. In certain embodiments, all mirrors can be in the on-state and imaging can be done without any compressed sensing at all, e.g., in a compressed sensing module failure mode.

In certain embodiments, referring to FIG. 8, the compressed sensing module 119 can be configured to activate a plurality of micro-mirrors 115 simultaneously for less than maximum resolution. For example, as shown at $t_1$, diagonal micro-mirrors 115 can be activated simultaneously and the FPA 117 can take a reading. At $t_2$, another plurality of micro-mirrors 115 can be simultaneously activated and another reading can be taken by the FPA 117. As shown in FIG. 8, the compressed sensing module 119 can be configured to activate time-sequenced varying pluralities of micro-mirrors 115 to obtain at least one activation of all micro-mirrors 115. For example, in certain embodiments, the time sequenced varied pluralities can include a single actuation of each micro-mirror 115.

Any other suitable simultaneous and/or time sequenced pattern to produce a desired resolution is contemplated herein. Any combination of simultaneous and/or time sequenced patterns are contemplated herein. Certain patterns and/or combinations thereof can be created to statistically minimize loss of information. Additionally or alternatively, the rate at which the micro-mirrors 115 are activated can be selected and/or changed to increase or decrease resolution as would be appreciated by those having ordinary skill in the art in view of this disclosure.

For example, for a lower resolution image, all micro-mirrors 115 can be activated simultaneously as shown in FIG. 9. Low resolution can be used to reduce bandwidth of data in areas of an image that are not of present interest or do not need high definition imaging.

In certain embodiments, the compressed sensing module 119 can be configured to modify the activation pattern of one or more of the DMDs 113 to enhance resolution of a portion of the FOV, for example. In certain embodiments, the apparatus 100 can include a tracking algorithm module 121 configured to track an object (e.g., a projectile, an aircraft, a vehicle) and to cause enhanced resolution for areas of the image associated with the object. For example, the system 100 can be used in a low resolution mode to reduce data bandwidth, and the tracking module 121 can determine when an object is of interest (e.g., based on a speed of motion, based on motion relative to the device 100, etc.). If an object is determined to be of interest, the tracking module 121 can cause the compressed sensing module 119 to increase resolution on the DMDs 103 associated with that portion of the FOV. The resolution can be increased to maximum, for example, or any other suitable level using any suitable simultaneous and/or time sequenced pattern for the micro-mirrors 115 as disclosed herein.

DMDs 113 and/or FPAs 117, and/or any other component(s) of apparatus 100 can be configured to work with any suitable wavelength(s) of light. For example, embodiments can be configured to operate with visible light, short-wave infrared light, medium-wave infrared light, long-wave infrared light, or any other suitable type.

Figure 10:
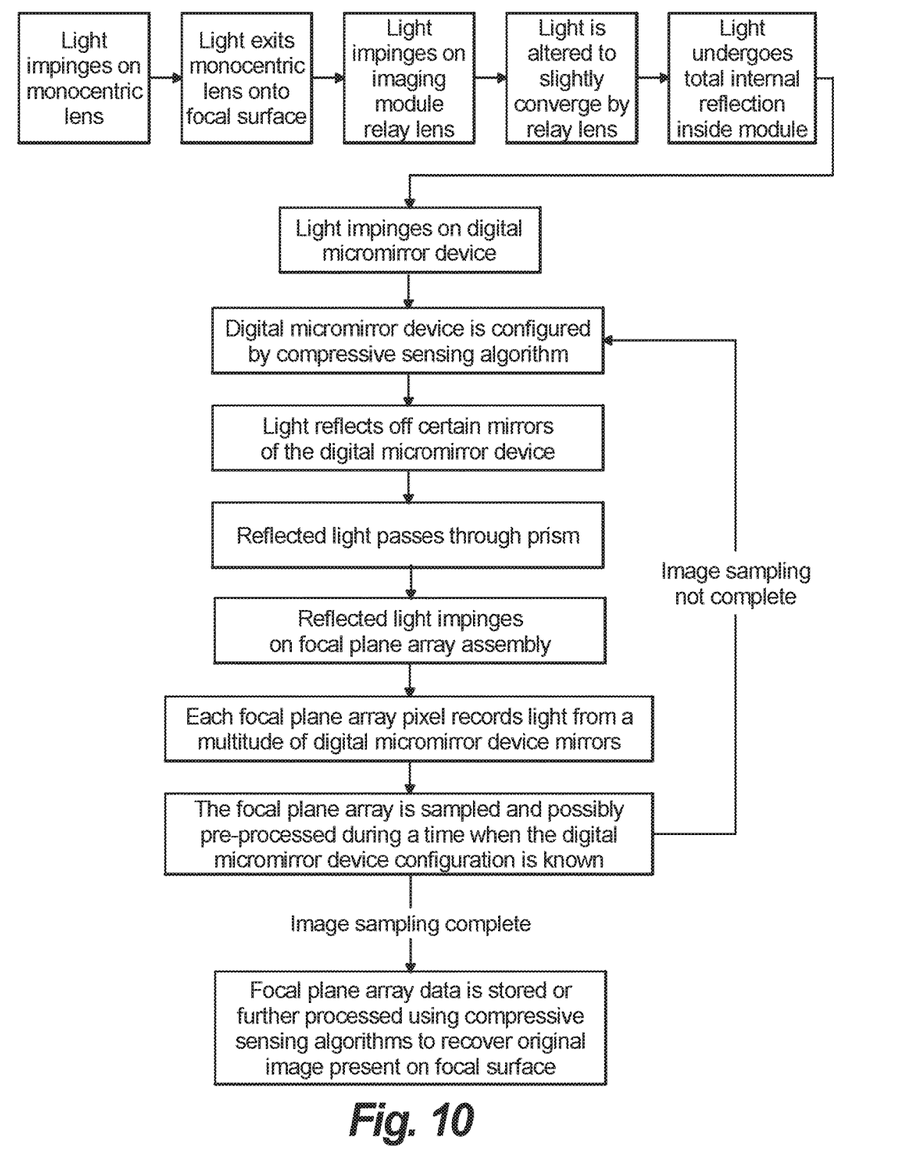
FIG. 10 is an embodiment of a method in accordance with this disclosure.

In accordance with at least one aspect of this disclosure, a method can include controlling a plurality of micro-mirrors 115 of a digital micro-mirror device (DMD) 113 in time sequence to create a pixelated image based on a location of one or more of the micro-mirrors 115 (e.g., A, B, C, D) and a light signal received at a light sensor (e.g., FPA 117) as a function of time. The method can include controlling a simultaneous and/or sequential activation pattern of the plurality of the micro-mirrors 115 to control a resolution of the pixelated image. An embodiment of a method in accordance with this disclosure is shown in FIG. 10.

Embodiments generally require lower power, less cooling, smaller FPAs, less lenses, and no macro-moving parts compared to traditional sensors. Embodiments can utilize a simple, un-powered, damped, stabilization system to prevent ship listing, or any other type of general vehicle motion, from seriously degrading the FOV relative to the horizon. Any small movement in FOV can be corrected in imaging software and/or hardware, e.g., with an associated small reduction (such as a few degrees) in vertical FOV. Embodiments can also be designed with a large enough vertical FOV (e.g., greater than 50°) such that, even with significant motion, the software and/or hardware correction can still leave the required 50° FOV.

Embodiments include a spatial multiplexing camera approach using a folded-monocentric compressively-sensed design. Embodiments allow a full 360°×50° (azimuth× elevation) field of view (FOV) at 30 microradian instantaneous field of view (ifov) and 20 Hz. Certain embodiments have no macro-moving parts and utilize very small MWIR arrays (64×64) coupled with Digital Mirror Devices (DMDs) to perform the compressively-sensed imaging. In addition, embodiments can use only one primary optic which is shared amongst all the sensor modules. By creating sensor modules with small FPAs and commercially available DMDs, and using only one primary optic, embodiments can be relatively inexpensive and compact. Embodiments of the compressive sensing design can significantly reduce data bandwidth and can be also well-suited to simultaneously achieving, at high frame-rates, low-resolution situation awareness and high-resolution tracking, and everything in between.

Referring to FIG. 4, the lines/frustums shown in the FOV represent high-resolution target tracking with, e.g., a 64×64 ifov patch of (1920 μrad). The outer surface represents an arbitrary 3 meter perpendicular ground sample distance (i.e., the perpendicular distance subtended by the pixel at range) at a distance of 54 nautical miles. The zoomed-in view shows −20° lower FOV limit intersecting the ocean at a distance.

Certain embodiments can utilize, e.g., approximately 1450 FPA/DMD sensor modules, or any other suitable number, while keeping the total number of FPA pixels less than 6 Mpix. Because a micro-mirror is used in place of each traditional camera pixel, this greatly reduces the overall system cost. Also, DMDs are very reliable, and even where individual mirrors fail, it will have little effect on overall system performance.

The conventional Shannon-Nyquist approach would require a spatio-temporal resolution (STR) of ~121 Gsamples/sec (STR=FOV×20 Hz/ifov$^2$). Using a nominal high-resolution compression factor of $\alpha$=16 yields an STR of 7.6 Gsamples/sec to reconstruct full high-resolution video across the entire FOV at 20 Hz. Significant further reduction is allowed since most of the FOV, those parts devoid of targets for example, can be be low-resolution video. In addition, the overall system can be stationary so there is no need for slip rings or fiber optic rotary joints to get data from the sensors to the displays.

In accordance with at least one aspect of this disclosure, an imaging apparatus, comprising, a plurality of imaging modules each having at least one digital mirror device (DMD); and at least one optical element defining an axis (e.g., a horizontal axis), the at least one optical element being in optical communication with the plurality of imaging modules such that the plurality of imaging modules can simultaneously capture images that collectively are representative of a field of view a full 360 degrees about the axis and surrounding the imaging apparatus. The apparatus can include a compressed sensing module in operable communication with the at least one DMD configured to alter resolution of images captured by one or more of the plurality of imaging modules. In certain embodiments, none of the at least one optical element moves relative to the plurality of imaging modules while images are being captured.

Benefits of compressive-sensing can include elimination of need for massive number of MWIR pixels and/or very large MWIR FPAs and cooling requirements, tremendous algorithmic flexibility in target tracking and situational awareness, lower cost components, and module upgrades that can be simple to implement and install. Benefits of embodiments of a monocentric lens can include diffraction-limited imaging in a very large conical field-of-view (FOV) with a half-angle, e.g., of approximately 60 degrees, imaging of a large FOV onto a spherical focal surface, without the large distortions and size of a fisheye lens, only a single lens is needed with, e.g., a modest focal length of approximately 6.5 to approximately 9 inches, lighter weight systems, and less expensive. Benefits of embodiments of a conical folding mirror can include mapping of the lens FOV from a conical to an annular shape, allowing for a 360 deg. panoramic FOV, a panoramic FOV with only small astigmatic distortion, and any astigmatic distortion can be corrected in module optics (if required at all).

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The computer program code may also be written in a higher-level interpreted language and automatically converted into a lower-level compiled language, e.g., to speed up development time but still yield a fast compiled version of the computer program code. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, using any type of protocol, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Any suitable combination(s) of any disclosed embodiments and/or any suitable portion(s) thereof is contemplated therein as appreciated by those having ordinary skill in the art.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A large field-of-view (FOV) imaging apparatus, comprising:
   a monocentric lens; and
   a plurality of imaging modules comprising digital mirror device(s) (DMD) arranged to form or arranged in proximity to a spherical focal surface in optical communication with the monocentric lens such that the monocentric lens directs light rays that enter the monocentric lens at a surface of the monocentric lens towards the spherical focal surface and into the imaging modules as a function of incident angle of each light ray relative to a reference plane.

2. The apparatus of claim 1, further comprising a conical or otherwise azimuthally-symmetric mirror disposed in optical communication with the surface of the monocentric lens and configured to reflect light rays at a predetermined range of angles to provide a predetermined FOV.

3. The apparatus of claim 2, wherein the predetermined FOV is approximately 50 degrees.

4. The apparatus of claim 3, wherein the predetermined field of view is from approximately −25 degrees from the reference plane to approximately 25 degrees from the reference plane.

5. The apparatus of claim 1, wherein each of the imaging modules include a DMD array comprising a plurality of micro-mirrors in optical communication with a focal plane array (FPA).

6. The apparatus of claim 5, wherein an amount of FPA pixels is less than or equal to an amount of the DMD micro-mirrors and/or wherein the FPA are compressively sampled according to a compressed-sensing algorithm.

7. The apparatus of claim 6, wherein each DMD array is in optical communication with a single photosensitive device or pixel.

8. The apparatus of claim 5, further comprising a compressed sensing module configured to control a state of the micro-mirrors between an on-state and an off-state, and to select a simultaneous and/or time-sequenced activation pattern of micro-mirrors between the on-state and off-state, wherein the module is configured to allow reconstruction of an image based on the activation pattern of the micro-mirrors.

9. The apparatus of claim 8, wherein the compressed sensing module is configured to activate each micro-mirror individually in a time sequenced activation pattern for maximum resolution.

10. The apparatus of claim 9, wherein the compressed sensing module is configured to activate a plurality of micro-mirrors simultaneously for less than maximum resolution.

11. The apparatus of claim 10, wherein the compressed sensing module is configured to activate time-sequenced varying pluralities of micro-mirrors to obtain at least one activation of all micro-mirrors.

12. The apparatus of claim 11, wherein the time sequenced varied pluralities include a single actuation of each micro-mirror.

13. The apparatus of claim 8, wherein the compressed sensing module is configured to modify the activation pattern of one or more of the DMD arrays to enhance resolution of a portion of the FOV.

14. The apparatus of claim 13, further comprising a tracking module configured to track an object and to cause enhanced resolution for areas of the image associated with the object.

15. The apparatus of claim 1, wherein the apparatus does not include any macro-moving parts.

16. The apparatus of claim 1, wherein the reference plane is orthogonal to a central axis of the monocentric lens.

17. An imaging apparatus, comprising:
   a plurality of imaging modules each having at least one digital mirror device (DMD); and
   at least one optical element defining an axis, the at least one optical element being in optical communication with the plurality of imaging modules such that the plurality of imaging modules can simultaneously capture images that collectively are representative of a field of view a full 360 degrees about the axis and surrounding the imaging apparatus.

18. The imaging apparatus of claim 17, further comprising a compressed sensing module in operable communication with the at least one DMD configured to alter resolution of images captured by one or more of the plurality of imaging modules.

19. The imaging apparatus of claim 17, wherein none of the at least one optical element moves relative to the plurality of imaging modules while images are being captured.

* * * * *